UNITED STATES PATENT OFFICE.

OLIVER W. BROWN AND ALPHEUS R. NEES, OF BLOOMINGTON, INDIANA.

PRODUCTION OF LEAD OXIDS.

1,072,205. Specification of Letters Patent. Patented Sept. 2, 1913.

No Drawing. Application filed September 9, 1912. Serial No. 719,377.

*To all whom it may concern:*

Be it known that we, OLIVER W. BROWN and ALPHEUS R. NEES, citizens of the United States, residing at Bloomington, in the county of Monroe and State of Indiana, have invented certain new and useful Improvements in the Production of Lead Oxids, of which the following is a specification.

Our invention relates to an improved process for the production of lead oxids whereby to obtain a product of low specific gravity and density, amorphous in character, and particularly suited to the manufacture of storage plates and like uses.

Oxids of lead, litharge and red lead, of amorphous nature and of low real specific gravity and low apparent density are very desirable in certain arts as for example in the manufacture of storage battery plates. By reason of the low specific gravity and the amorphous character of such oxids the plates made from them are lighter, more porous and of greater capacity than those made from the comparatively dense crystalline oxids. A further advantage from the standpoint of manufacture is that the paste made from the amorphous oxids preparatory to molding plates, is much more plastic and has a higher tensile strength than similar pastes made from the crystalline oxids. Battery plates made from crystalline oxids also lack mechanical strength, are brittle and of short life, the coarser crystalline oxids forming dense plates which have a lower capacity than those made from the amorphous oxids of lower specific gravity. In this art, red lead is usually made from litharge which has previously been fused, or from an oxid of lead which has been heated to about 500° C. This litharge is crystalline and whatever the temperature at which it is converted into red lead, the resultant product will be crystalline and have a high specific gravity. The apparent density is ordinarily reduced somewhat by grinding. This, however, does not alter the real specific gravity or the crystalline nature of the product.

We have found that if an amorphous product of low specific gravity is to be had it is necessary to guard against overheating at all stages of production. We also find that the specific gravity is affected by the duration of the heating. At temperatures above 500° C. changes take place which cause the product to become more dense and hence to have a higher specific gravity. At a temperature of about 525° C. red lead is reduced to litharge which may again be converted into red lead by heating again at a lower temperature. The ultimate product so obtained has a higher specific gravity and a higher apparent density than before reduction. Tests have demonstrated, for instance, that a red lead having a specific gravity of 8.93 when partially reduced to litharge and then re-oxidized had a specific gravity of 9.75, an increase in specific gravity of .82. An increase in specific gravity takes place when the red lead is heated above 480° C. even though there be no reduction to litharge, the red lead tending to become more dense and of a more crystalline structure at this temperature. It follows that in order to secure a product of low specific gravity and density it is necessary to so regulate the temperature as to maintain the same below 480° C. in order to produce the amorphous instead of the crystalline product. If the temperature is maintained below 300° C. a product of low specific gravity and density is formed. Using as a starting material basic or neutral lead carbonate, lead hydrate, amorphous lead sponge, amorphous litharge or metallic lead, and treating the same at a temperature between 325° C. and 480° C. we are able to produce a red lead of low specific gravity and low density and amorphous in character, while by subjecting the material to a temperature between 425° C. and 440° C. a product of the lowest specific gravity and the lowest density is obtained. We have also found that, other conditions being the same, the specific gravity of the product increases with the time of heating and the tendency to the production of a crystalline product becomes stronger, as the heating is prolonged.

In the manufacture of a lead oxid from basic or neutral lead carbonate, lead hydrate or hydrated oxid we obtain the best results by heating the starting material in a rotary furnace for from three to three and one-half hours at a temperature between 425° C. and 440° C.

We claim:

1. The improved process for the production of lead oxids possessing low specific gravity and of an amorphous nature which consists in heating the starting material at a temperature below 450° C., substantially as described.

2. The improved process for the production of red lead or orange mineral possessing low specific gravity of an amorphous nature which consists in heating the starting material at a temperature between 325° and 440° C., substantially as described.

3. The improved process for the production of red lead or orange mineral possessing low specific gravity and of an amorphous nature which consists in heating the starting material for from three to three and one-half hours at a temperature between 425° C. and 440° C., substantially as described.

OLIVER W. BROWN.
ALPHEUS R. NEES.

Witnesses for signature of Oliver W. Brown:
J. D. BOBBITT,
NELL B. THOMPSON.

Witnesses for signature of Alpheus R. Nees:
DAVID E. WATSON,
A. M. BAIN.